(12) United States Patent
Flammer et al.

(10) Patent No.: US 9,389,344 B2
(45) Date of Patent: Jul. 12, 2016

(54) SPECTROSCOPIC POLARIMETER

(75) Inventors: P. David Flammer, Golden, CO (US);
Jonathan Peltzer, Denver, CO (US);
Russell Hollingsworth, Arvada, CO (US)

(73) Assignee: Colorado School of Mines, Golden, CO (US)

( * ) Notice: Subject to any disclaimer, the term of this patent is extended or adjusted under 35 U.S.C. 154(b) by 850 days.

(21) Appl. No.: 13/507,479

(22) Filed: Jun. 28, 2012

(65) Prior Publication Data

US 2013/0120840 A1 May 16, 2013

Related U.S. Application Data

(60) Provisional application No. 61/502,193, filed on Jun. 28, 2011.

(51) Int. Cl.
*G02B 5/30* (2006.01)
*G02B 5/00* (2006.01)
*G01J 4/00* (2006.01)

(52) U.S. Cl.
CPC . *G02B 5/008* (2013.01); *G01J 4/00* (2013.01); *G02B 5/3058* (2013.01)

(58) Field of Classification Search
CPC ........ G02B 5/30–5/3091; G02B 6/00–6/0001; G02B 6/0011; G02B 6/0018; G02B 6/0026; G02B 6/0038; G02B 6/0045; G02B 6/0056–6/0061; G02B 6/10; G02B 6/105–6/107; G02B 6/122; G02B 6/1226; G02B 6/126; G02B 6/29302; G02B 6/27–6/274; G02B 6/2753–6/2773; G02B 6/293; G02B 6/29331–6/29337; G02B 6/29356; G02B 6/29358; G02B 27/28; G02B 27/286–27/288; G02B 27/56

USPC ........... 359/322, 483.01–493.01; 385/11–12, 385/15, 27, 30, 31, 39, 51, 129–132, 385/146–147; 356/364, 366–367; 427/162–163.2

See application file for complete search history.

(56) References Cited

U.S. PATENT DOCUMENTS

| | | | |
|---|---|---|---|
| 4,583,818 | A | 4/1986 | Chen et al. |
| 4,787,690 | A | 11/1988 | Maerz |
| 6,501,783 | B1 | 12/2002 | Capasso et al. |
| 6,987,913 | B2 | 1/2006 | Blauvelt et al. |
| 7,010,183 | B2 | 3/2006 | Estes et al. |
| 7,072,553 | B2 | 7/2006 | Johnson et al. |
| 7,242,705 | B2 | 7/2007 | Kneissl et al. |
| 7,400,399 | B2 | 7/2008 | Wawro et al. |

(Continued)

OTHER PUBLICATIONS

Flammer, et al., "Interference and resonant cavity effects explain enhanced transmission through subwavelength apertures in thin metal films," Optics Express, 2007, vol. 15, No. 13, pp. 7984-7993.

(Continued)

*Primary Examiner* — Derek S Chapel
(74) *Attorney, Agent, or Firm* — Sheridan Ross P.C.

(57) ABSTRACT

A spectroscopic polarimeter and methods of manufacturing the same are provided. The spectroscopic polarimeter is described as being fabricated by etching or patterning grooves into a substrate with a centrally smooth area, laying down an opaque thin layer of metal, etching out a central cavity from the metal, laying down a thin layer of dielectric material, and then laying down metal over the cavity. Optionally, before or after the dielectric layer is laid, a thicker metal barrier at the edge of the design can be laid as well.

18 Claims, 7 Drawing Sheets

(56) References Cited

U.S. PATENT DOCUMENTS

| | | | |
|---|---|---|---|
| 7,454,095 B2 | 11/2008 | Baehr-Jones et al. | |
| 7,567,606 B2 | 7/2009 | Carras et al. | |
| 7,577,327 B2 | 8/2009 | Blauvelt et al. | |
| 7,636,502 B2 | 12/2009 | Mao et al. | |
| 7,670,758 B2 * | 3/2010 | Wang et al. | 430/321 |
| 7,679,748 B2 | 3/2010 | Chen et al. | |
| 7,772,555 B2 | 8/2010 | Hollingsworth | |
| 8,189,204 B2 * | 5/2012 | Cui et al. | 356/521 |
| 8,238,702 B2 | 8/2012 | Flammer | |
| 8,552,410 B2 * | 10/2013 | Capasso et al. | 250/493.1 |
| 2010/0014808 A1 * | 1/2010 | Flammer | 385/37 |
| 2010/0119192 A1 | 5/2010 | Fujikata et al. | |
| 2010/0128273 A1 | 5/2010 | Lee et al. | |
| 2011/0222564 A1 | 9/2011 | Belkin et al. | |

OTHER PUBLICATIONS

Official Action for U.S. Appl. No. 12/455,710, mailed Jul. 28, 2011 8 pages Restriction Requirement.

Official Action for U.S. Appl. No. 12/455,710, mailed Oct. 28, 2011 12 pages.

Notice of Allowance for U.S. Appl. No. 12/455,710, mailed Apr. 6, 2012.

* cited by examiner

SPECTROSCOPIC POLARIMETER

CROSS-REFERENCE TO RELATED APPLICATION

This Application claims the benefit of U.S. Provisional Application No. 61/502,193, filed Jun. 28, 2011, the entire disclosure of which is hereby incorporated herein by reference.

The U.S. Government has a paid-up license in this invention and the right in limited circumstances to require the patent owner to license others on reasonable terms as provided for by the terms of FA9550-10-C-0024 awarded by the Air Force Office of Scientific Research.

FIELD

The present disclosure relates generally to spectroscopic polarimeters and devices incorporating the same.

BACKGROUND

Polarization-resolved imaging of light plays an important role in a number of applications, yielding information about the orientation, material type, and roughness of a surface. Imaging polarimeters examine the polarization state of light reflected or emitted from objects, providing information complementary to the intensity and wavelength data provided by most cameras.

Some efforts have been made to provide camera designs that employ passive imaging polarimeters. Early embodiments of this concept involved time-sequenced serial or amplitude-division parallel polarization filtering in the aperture plane of a conventional imaging system. Advances in nanofabrication have led to increased attention on division of focal plane systems in which an array of micro-polarizing elements is monolithically integrated directly on a Focal Plane Array (FPA) sensor. The mechanical robustness, permanent polarizer-to-sensor alignment, and potential for low-cost fabrication provide significant advantages for this approach, while recent advances in image reconstruction algorithms mitigate the artifacts that arise from each pixel looking at a slightly different part of the scene. Aluminum nanowire micro-polarizer arrays have been demonstrated at visible wavelengths, but they have low polarization selectivity (<100:1 at best for red, 50:1 for blue), suffer from substantial pixel-to-pixel optical cross talk, and require extremely fine lithography (70 nm line widths). These systems have examined only linear polarization due to the difficulty in fabricating micro-polarizing structures sensitive to circular polarization. Linear polarization imaging is adequate for passive imaging applications, but substantially limits active imaging where the scene is illuminated with a set of controlled polarizations.

SUMMARY

The present disclosure builds upon the plasmonic technology described in U.S. Patent Publication No. 2010/0014808 to Flammer, the entire contents of which are hereby incorporated herein by reference. In particular, embodiments of the present disclosure provide plasmonic micro-polarizing filters that can be tuned for linear or circular polarization response through simple changes in horizontal geometry. Furthermore, the plasmonic micro-polarizer described herein substantially solves all of the problems with aluminum nanowire polarizers.

Some aspects of the present disclosure include: (1) wavelength scaling through geometric parameters for operation from ultraviolet or blue to red or infrared, and to longer wavelengths; (2) simultaneous fabrication of linear and circular micro-polarizers; (3) high transmission efficiency for desired polarization; (4) high rejection for cross polarization for specified wavelengths (extinction ratios up to $10^8$); (5) light concentration into a sub-wavelength aperture allows use of small, high speed, low noise detectors with reduced electrical crosstalk; (6) fabrication as part of detector contact metal eliminates optical crosstalk due to the polarizers; and (7) low cost fabrication using standard Si CMOS processes with 180 nm line widths.

In some embodiments, the filter includes a patterned metal film having an aperture in a central cavity that is surrounded by gratings. The aperture and gratings are covered with a transparent dielectric layer to form a surface plasmon slab waveguide that supports only transverse magnetic (TM) polarized modes. A metal cap covers the aperture and forms a metal-insulator-metal (MIM) waveguide. The gratings couple light into surface plasmons, and the cavity width is adjusted to obtain constructive interference. Structures with linear apertures and gratings provide sensitivity to linear polarization, while structures with circular apertures and spiral gratings, such as an Archimedean spiral, are directly sensitive to circular polarization. An optional metal side mirror reflects outwardly propagating surface plasmons back toward the aperture to increase the efficiency. Transverse electric (TE) modes are cut off due to the subwavelength dielectric thickness in the MIM waveguide while the TM modes are transmitted, providing the potential for extremely high linear extinction ratios.

One advantage of the devices proposed herein is the potential for monolithic integration of the plasmonic structures on a CMOS photodiode focal plane array using standard CMOS processes. The plasmonic structure can be fabricated directly into the Ohmic contact metallization of the diode, completely eliminating the possibility of optical crosstalk due to the polarizing filters. Since transmission is limited to the sub-wavelength dimension aperture, the active area of the detectors can be reduced allowing higher speed, lower noise diodes to be used. Smaller active area detectors also aid in reducing electrical cross talk.

Embodiments of the present disclosure may employ post process fabrication on top of an oxide that prevents direct contact with the silicon, but does allow the collection area to extend over the pixel switching transistors for 100% fill factor. In addition, a grating on the output (lower) surface of the metal can be used, which will act as a Fresnel lens to focus light into the active area of the pixel. The complete structure may occupy a lateral extent of about eight times the free space operating wavelength (e.g., 4.5 µm extent for 550 nm (green) operation). Commercial FPAs with 5-6 µm pixel pitch are widely available in 640×480 and 1280×1024 formats.

In accordance with at least some embodiments, a micro-polarizer is provided that generally comprises a plasmonic focusing structure that both filters light at a predetermined frequency bandwidth and selects a single polarization state. In some embodiments, the focusing structure of the micro-polarizer comprises:

a substrate comprising a first major surface and a second major surface;

a first metal layer comprising a first major surface and a second major surface, the first major surface of the first metal layer positioned adjacent to the second major surface of the substrate;

a dielectric layer comprising a first major surface and a second major surface, the first major surface of the dielectric layer positioned adjacent to the second major surface of the first metal layer;

a plurality of grooves established in the second major surface of the first metal layer, the first major surface of the dielectric layer, and the second major layer of the dielectric layer, wherein the plurality of grooves comprise a cavity between them and wherein the cavity width between about 800 nm and about 2400 nm or between about a wavelength of the radiation to many wavelengths. For example, for 800 nm free space wavelength cavity widths from about 800 nm to about 2400 nm are typical.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

The terms "determine", "calculate" and "compute," and variations thereof, as used herein, are used interchangeably and include any type of methodology, process, Mathematical operation or technique.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description.

BRIEF DESCRIPTION OF THE DRAWINGS

The accompanying drawings, which are incorporated in and constitute a part of the specification, illustrate embodiments of the disclosure and together with the general description given above and the detailed description of the drawings given below, serve to explain the principles of these embodiments.

It should be understood that the drawings are not necessarily to scale. In certain instances, details that are not necessary for an understanding of the disclosure or that render other details difficult to perceive may have been omitted. It should be understood, of course, that the claimed subject matter is not necessarily limited to the particular embodiments illustrated herein.

DETAILED DESCRIPTION

Figure 1:
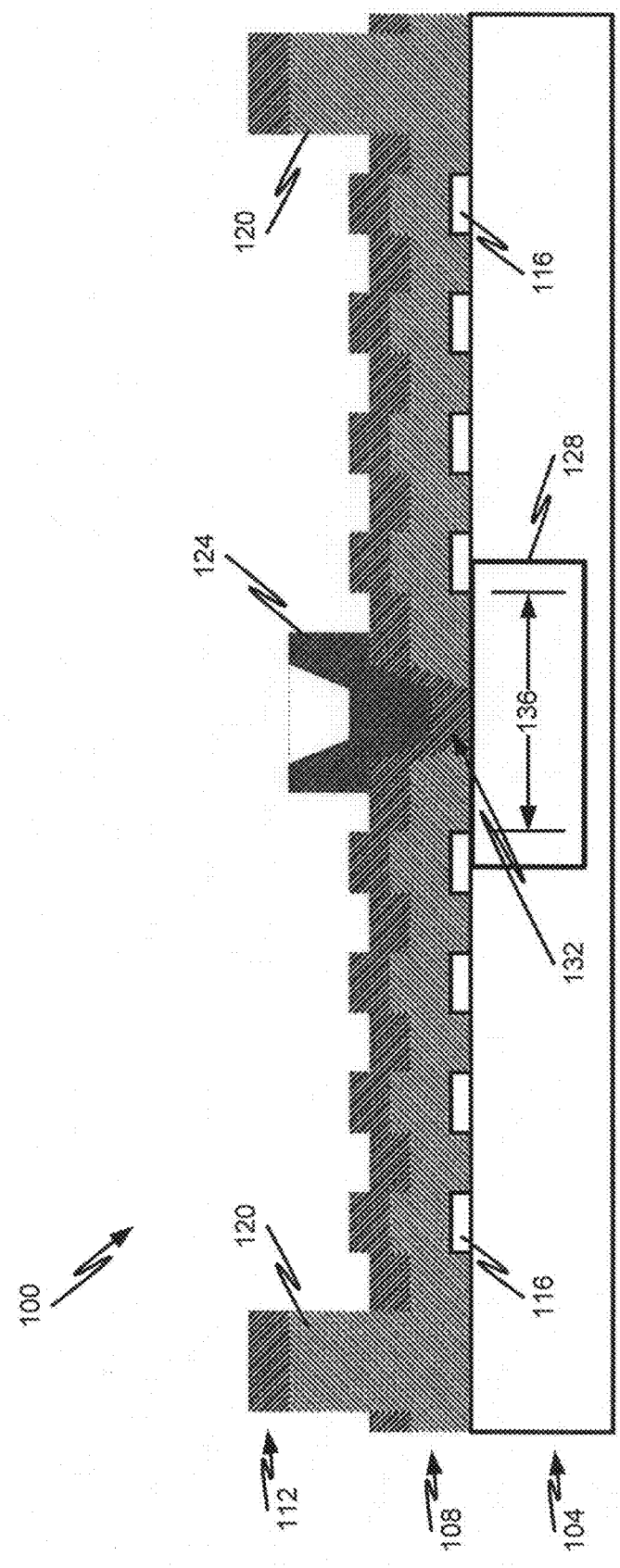
FIG. 1 is a cross-sectional view of a micro-polarizer and detector in accordance with embodiments of the present disclosure.
Figure 2:
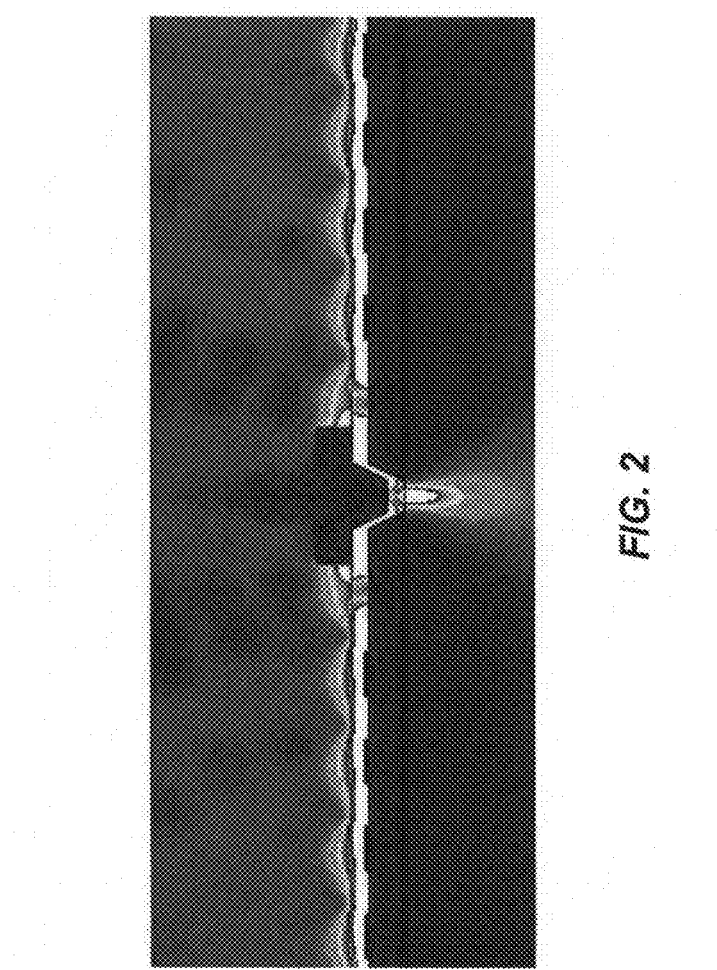
FIG. 2 depicts the transmission of TM polarization for the design shown in FIG. 1.
Figure 3:
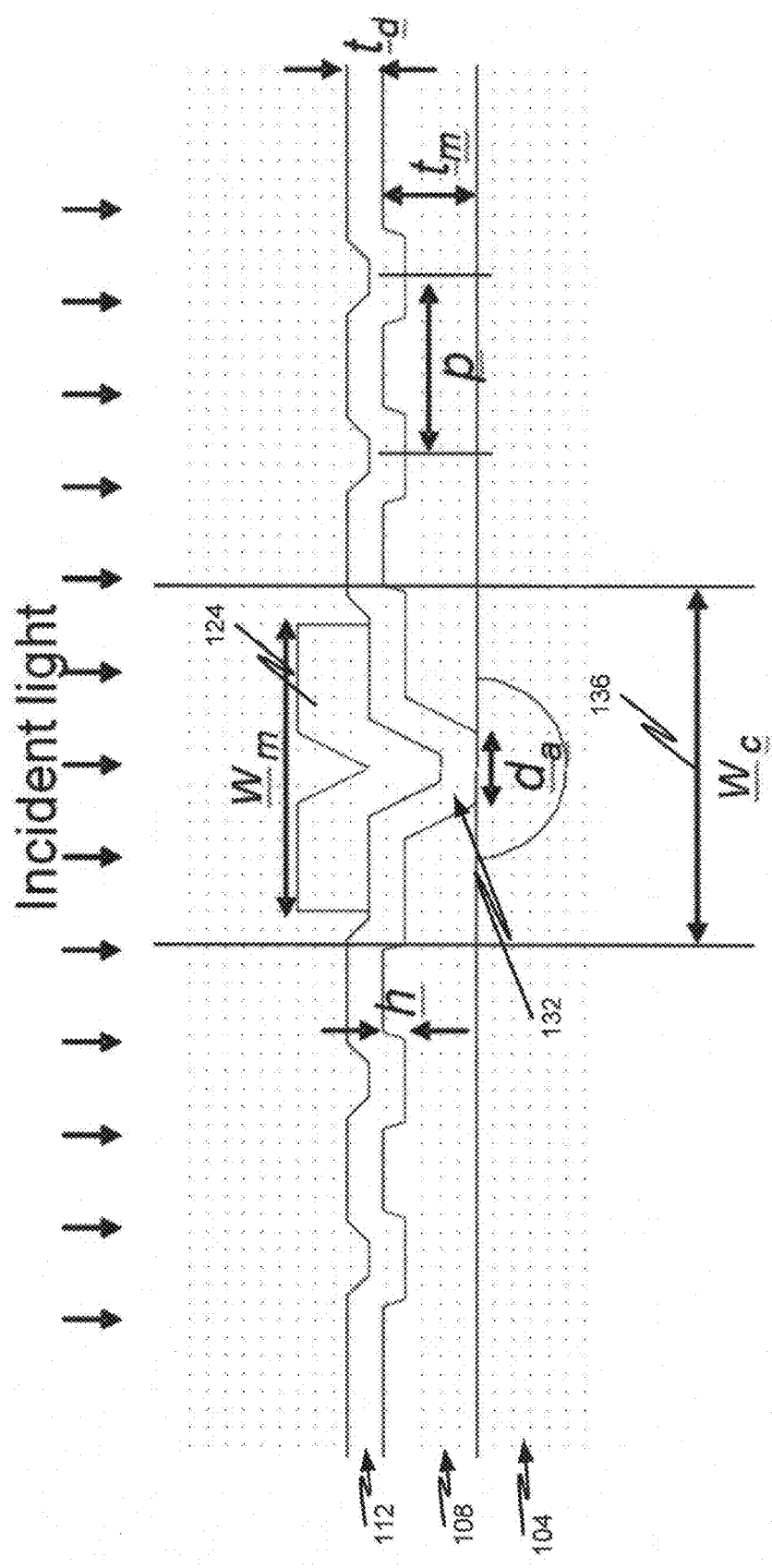
FIG. 3 is a cross-sectional view of a micro-polarizer in accordance with embodiments of the present disclosure.

FIGS. 1-3 depict an illustrative configuration of a micro-polarizer 100 comprising a plasmonic structure that both filters light at a predetermined frequency bandwidth and also selects a single polarization state. More specifically, the micro-polarizer 100 comprises a substrate material 104 onto which a metal layer 108 is provided. The substrate material 104 may comprise any type of known substrate such as Silicon, Silicon diode, a dielectric material, or any other type of known polymer. The substrate 104 may comprise a plurality of gratings 116 established on a first major surface (e.g., a top surface of the substrate 104). The gratings 116 may be centered or configured around an aperture or central cavity 132 that is established in the metal layer 108. In some embodiments, the gratings 116 comprise a height (h) of between approximately 10 nm to 30 nm or more specifically a height (h) of approximately 20 nm. The gratings 116 may also be established with a specific periodicity (p) corresponding to the wavelength of light that is to be filtered by the structure. As a non-limiting example, the periodicity of the gratings 116 about the aperture 132 may be between approximately 400 nm and 850 nm or more specifically approximately 500 nm.

The metal layer 108 may comprise any type of known metallic material that supports surface plasmons at the operating wavelength. Suitable examples of materials that may be used to construct the metal layer 108 include, without limitation, Al, Ag, Au, combinations thereof, etc. In some embodiments, the metal layer 108 is laid down on the substrate 104 after the gratings 116 have been established. In some embodiments, the gratings 116 may be originally provided as part of the substrate 104. In some embodiments, the gratings 116 may be deposited on the substrate 104 using any type of known deposition and/or etching techniques.

The metal layer 108 may have a thickness (e.g., $t_m$) that is approximately between 150 nm and 300 nm. In some embodiments, the thickness of metal layer 108 may be approximately 200 nm. The metal layer 108 can be deposited on the substrate 104 using any type of known deposition technique such as, for example, Chemical Vapor Deposition (CVD), evaporation, sputtering, etc. Eventually, a substantially opaque and thin metal layer 108 is established over the substrate 104 and its gratings 116.

As part of depositing the metal layer 108 or after the metal layer 108 has been deposited, the aperture 132 may be established around or above the center of the substantially smooth portion of the substrate 104. The aperture 132 may completely extend from the top major surface of the metal layer 108 through to the bottom major surface of the metal layer 108, thereby exposing a center portion of the substrate 104. In some embodiments, the aperture 132 may be established using any type of etching, cutting, chemical, or material-removing process.

In some embodiments, the aperture 132 comprises an aperture width or diameter ($d_a$) that is between approximately 100 nm and 600 nm and more specifically approximately 200 nm. The distance between gratings 116 about the aperture 132 forms a resonant cavity 136 whose width ($w_c$) is approximately an integer multiple of the operating wavelength, approximately 800 nm to approximately 2400 nm.

After the aperture 132 has been established through the metal layer 108, a dielectric layer 112 may be established on top of the metal layer 108. More specifically, a relatively thin layer of dielectric material 112 may be evenly established over the metal layer 108 and the gratings 116. The dielectric layer 112 may be constructed using any known type of dielectric material such as SiO2 or SiN. In particular, any transparent dielectric material may be suitable for use in the dielectric layer 112 and the specific type of dielectric material selected may depend upon the material used for the metal layer 108. In particular, it may be difficult to deposit SiO2 directly onto silver. Accordingly, if silver is used for the metal layer 108, then it may be desirable to use SiN or some other type of dielectric material. The dielectric layer 112 may comprise a thickness ($t_d$) that is between approximately 50 nm and 200 nm or more specifically approximately 100 nm.

A metal cap 124 may then be established partially or completely over the aperture 132 and on top of the dielectric layer 112. The metal cap 124 may comprise a width ($w_m$) of between approximately 1200 nm and 2000 nm and more specifically of approximately 1600 nm. The metal cap 124 may also comprise a thickness of between approximately 100 nm and 300 nm and more specifically of approximately 200 nm. In some embodiments, the metal cap 124 is constructed of gold, but it should be appreciated that any other suitable type of metal can be used to form the metal cap 124.

The example dimensions described above are particularly well suited for passing a narrow band of light centered at 700 nm wavelength. It should be appreciated that embodiments of the present disclosure are not necessarily limited to the specific example dimensions described herein. Rather, the dimensions and ratios of dimensions of the various components of the micro-polarizer 100 can be adjusted to accommodate any type of desired condition.

In some embodiments, the aperture 132 and smooth cavity 136 between gratings 116 will eventually correspond to a location where plasmonic TM modes propagate down the waveguide of the metal layer 108. Accordingly, a sensor or array of sensors 128 may be provided within the substrate 104 in proximity to the aperture 132. Moreover, TE modes may be cut off by the subwavelength dielectric 112 thickness and, therefore, may be inhibited from passing along the metal layer 108 down through the aperture 132 into the sensor 128.

In some embodiments, the aperture 132, cavity 136, and gratings 116 being covered with the dielectric layer 112 form a surface plasmon slab waveguide that supports only TM polarized modes. The metal cap 124 partially or completely covers the aperture 132 to create a metal-insulator-metal (MIM) waveguide. The gratings 116, in some embodiments, couple light into surface plasmons and the distance between the cap 124 and the grating 116 is adjusted to obtain constructive interference. Structures with linear apertures 132 and gratings 116 provide sensitivity to linear polarization, whereas structures with circular apertures 132 and spiral gratings 116 give circular selectivity.

Furthermore, one or more optional metal side mirrors 120 may be provided at the ends of the waveguides (e.g., surrounding the gratings 116). The side mirrors 120 may be sufficiently sized to reflect outwardly propagating surface plasmons back toward the aperture 132. This additional reflection provided by the mirrors 120 enhances the overall efficiency of the micro-polarizer 100. The mirror may be placed on top of the dielectric layer or below (which is shown in FIG. 1)

As can be seen in FIG. 2, plasmonic TM modes are allowed to propagate down MIM waveguides with arbitrarily thin dielectric layers 112, while TE modes are cut off by the subwavelength dielectric thickness with exponential attenuation. This provides the potential for extremely high linear extinction ratios. Spiral gratings 116, such as those depicted in FIGS. 4-7 (e.g., Archimedean or exponential), provide direct sensitivity to circular polarization.

Surface plasmons are possible when the real part of the dielectric constant is negative; they have lower Ohmic losses when the imaginary part is small, a condition satisfied in noble metals in an appropriate range of wavelengths. Silver generally has the lowest loss of any metal, but is difficult to work with because it corrodes easily. Gold tends to be favored for plasmonic applications because the nearly inert surface makes it easy to work with and the loss is almost as low as silver in the Infrared (IR). However, gold can only be used for deep red or IR wavelengths because of interband transitions in the green. There is one other aspect of the metal dielectric constant that is commonly overlooked, and that is its magnitude, particularly when trying to support a surface plasmon next to a dielectric other than air. Placing the metal near a higher index dielectric increases losses due to the lack of contrast between the metal and dielectric index of refraction. For the majority of the visible spectrum with SiO2 or SiN adjacent to the metal surface, aluminum is actually better than gold, and below about 550 nm, it is even better than silver. In addition, the propagation length for surface plasmons at the aluminum-silicon dioxide interface is nearly constant in the visible as well, making it a much better candidate for a broadband device. In accordance with at least some embodiments, Al can be used for designs operating in the visible spectrum (<700 nm) and gold can be used for longer wavelength designs.

Linear Micro-Polarizer Examples

As a non-limiting example, structures 100 have been fabricated with 19 grooves in each of the two gratings with 500 nm period and variable cavity width. For this structure, 1.07% and 1.53% of the light incident on the entire structure was measured and simulated to be collected in the far-field, respectively. The measured and simulated far-field TM transmission show good agreement in terms of both peak location and absolute transmission efficiency. The TE measurement is background limited for wavelengths longer than ~600 nm. The extinction ratio, calculated from the measured TM and TE values has a lower limit of 3200. Using the measured TM and simulated TE signals provides an estimate of about 10,000 as the true extinction ratio that would be seen in an ideal measurement. Since the TE signal comes from direct transmission through the gold film, the extinction ratio can easily be increased by orders of magnitude simply by making the metal layer 108 thicker. Attenuation of the TE signal as it propagates along the MIM waveguide to the aperture 132 provides a separate limit on the extinction ratio that becomes useful if the metal is sufficiently thick. The TE transmission through the aperture 132 decreases exponentially with increasing metal cap 124 width. Extinction ratios exceeding $10^{10}$ are predicted with reasonable values of metal layer 108 thickness and cap 124 width, as will be described in more detail below.

In U.S. Patent Publication No. 2010/0014808, it was shown that the maximum transmission occurred when two effects that were controlled by the cavity width were optimized: 1) when there is constructive interference at the aperture between surface plasmons and the incident plane wave, and 2) when successive reflections of the surface plasmon in the cavity form a Fabry-Perot resonance. The aperture or cavity width ($w_c$) provides another interesting design parameter for the structure with a cap 124 as well. In has been shown in simulations that for all wavelengths, transition from minimum to maximum transmission (or vice versa) occurs when the cavity 136 width ($w_c$) increases by ~500 nm. A large intensity variation is observed at the ~800 nm design wavelength (the input grating was separately optimized for that wavelength). Adjacent transmission maxima are observed for cavity 136 widths varying by approximately 1000 nm. All of these simulations were performed with fixed cap 124 width. The transmission decreases monotonically while varying the cap 124 width with fixed gap between the cap 124 and grating 116 due simply to increased losses in the MIM waveguide. This shows the interesting parameter for this structure is actually the separation between the cap 124 and the inner edge of each grating 116 rather than the cavity 136 width by itself. The maximum in transmission occurs when constructive interference between surface plasmons and the incident field maximize power coupling into the MIM waveguide at the edge of the cap 124. Increasing the cavity 136 width by 1000 nm increases the grating-cap separation by 500 nm, equivalent to one plasmon wavelength for the free space wavelengths shown, as would be expected for adjacent interference extrema. No noticeable cavity Fabry-Perot resonances were observed, which can be attributed to the fact that the presence of the cap 124 improves guiding of light down into and out of the aperture 132. This damps Fabry-Perot resonant effects in the cavity 136.

The symmetric input gratings 116 couple incident photons into surface plasmons traveling both toward and away from the aperture 132. Although all of the fabricated structures allow the power traveling away from the aperture 132 to be lost, visible wavelength structures with a terminating mirror 120 can be used to capture the component initially traveling away from the aperture 132. The mirror 120, in some embodiments, comprises a metal plug extending from the base metal layer 108 through the dielectric layer 112 into the air above. In terms of fabrication, this would require an additional lithography step to remove the dielectric layer 112 and fill it with metal. The horizontal position of the mirror 120 relative to the grating 116 may be precisely controlled to ensure constructive interference between the reflected field and the field initially traveling toward the aperture 132. The optimum distance turns out to be approximately the free space wavelength divided by the mode index.

The side mirrors 120 increase the transmitted power as expected. The transmission is calculated by dividing the transmitted power by the power incident on the total device 100 area. For structures with no mirrors 120, this area is taken as the outer edge of the input gratings 116, while structures with mirrors 120 use the midpoint of the 500 nm wide mirrors 120 and hence have a larger area. The transmitted power therefore increases substantially. For instance, the actual transmitted power for a 2-groove, 550 nm design increases by a factor of 1.51 with the addition of the side mirrors 120 while the normalized transmission efficiency shows an increase of 8.8%. In addition to increasing the efficiency, the side mirrors 120 substantially reduce the transmission bandwidth. The asymmetric peaks for the structures with no mirrors 120 clearly come from multiple, overlapping resonances. Since the field reflected by the mirrors 120 can only be exactly in phase for constructive interference at a single wavelength, transmission far from that value is suppressed. It should be noted that substantially higher performance can be obtained at longer wavelengths using gold.

The skin depth of aluminum has a very small value at all visible and IR wavelengths, resulting in extremely low direct transmission in contrast to the fabricated Au layers discussed above. TE transmission is therefore determined by the attenuation along the MIM waveguide as light approaches the aperture 132. Initial modeling used a cap 124 width of 450 nm to minimize the loss due to light directly incident on the cap 124. The TM/TE extinction ratio had values around $10^4$ for most wavelengths. While this value is substantially larger than has been demonstrated in alternate micropolarizer designs, the exponential decay of the cut-off TE modes in the MIM waveguide allow extremely high extinction ratios to be obtained. At 800 nm wavelength, an MIM waveguide with 100 nm dielectric thickness has a cut-off TE mode with a decay constant of 2.1418 corresponding to a propagation length (length in which power is decreased by a factor of 1/e) of 30 nm. Therefore, every 70 nm of extra cap 124 length gives an order of magnitude decrease in TE transmission through the MIM waveguide. In contrast, the TM propagation length for the same conditions is about 3.7 microns, roughly 100 times that of the TE mode. Therefore, increasing the cap 124 width ($w_m$) to 1000 nm increases the calculated extinction ratio to values around $10^8$ for wavelengths greater than 550 nm with only a small decrease in TM transmission efficiency. The other method that can be employed is to decrease the oxide thickness. This cuts off the TE mode more rapidly, while only slightly increasing the TM losses. The extinction ratio at 400 nm was found to be very sensitive to the SiO2 thickness because the MIM waveguide does not cut-off the shorter wavelengths as strongly. For instance, reducing the 102 nm oxide thickness to 94 nm increases the 400 nm extinction ratio for the blue filter by nearly a factor of 30, the green filter by more than a factor of 10, and the already higher red filter by a factor of 5. Peak extinction ratios exceed $10^{10}$ for these designs. The two oxide thicknesses were obtained by optimizing the vertical dimensions (oxide thickness and grating groove depth) for 450 nm or 550 nm operation, with the shorter wavelength requiring a thinner oxide. Changing the oxide thickness has been shown to provide only a small impact on the TM transmission of RGB filters.

Circular Micro-Polarizer Examples

Figure 4A:
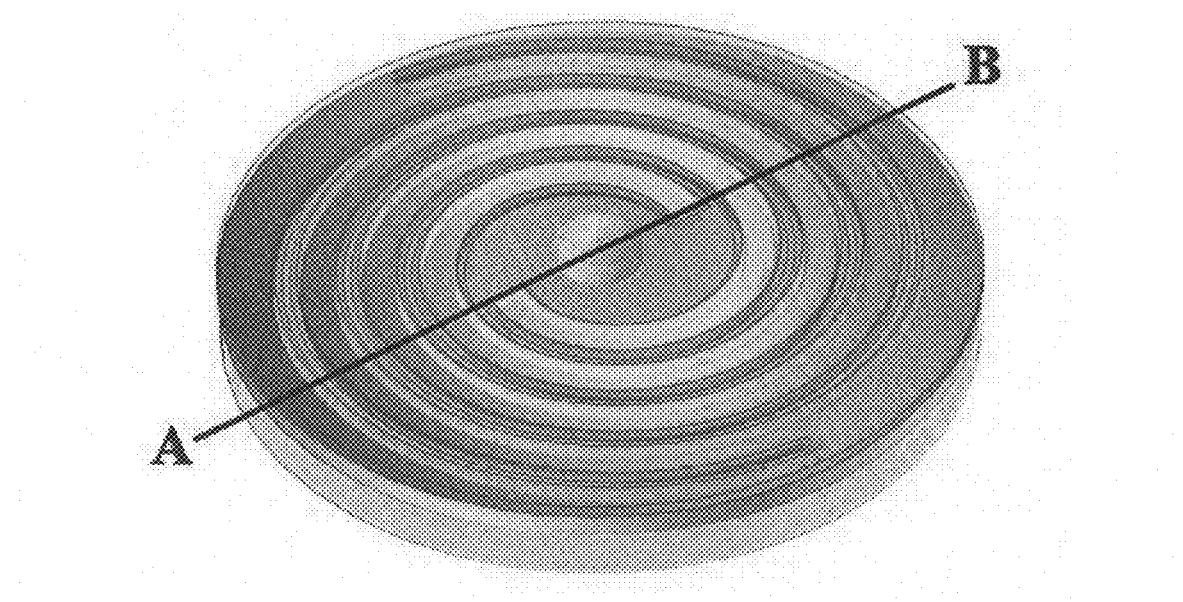
FIG. 4A is an isometric view of a spiral grating structure in accordance with embodiments of the present disclosure.
Figure 4B:
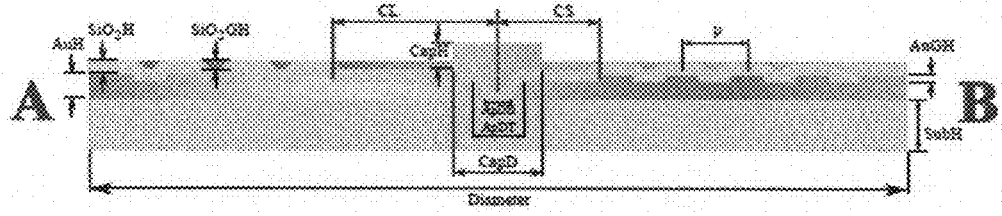
FIG. 4B is a cross-sectional view along line A-B shown in FIG. 4A.

In addition to providing linear micro-polarizer designs, embodiments of the present disclosure also contemplate the construction of a micro-polarizer that is sensitive to circular polarization. FIGS. 4A and 4B show one example such a structure, and the associated simulated transmission curves for both left and right circular polarization are shown in FIG. 5 for a few spiral arm lengths.

The illustrative spiral structure depicted in FIGS. 4A and 4B was designed for a filter that functions at about 700 nm free space wavelength. The approximate dimensions of interest for this particular example are: the aperture bottom diameter, apDB=200 nm; the aperture top diameter, ApDT=400 nm; the groove height, AuGH=60 nm; the gold thickness where grooves and cavity are cut out, AuH=140 nm; the cap thickness, CapH=200 nm; the cap diameter, CapD=688 nm;

the grating period, P=500 nm; the cavity length to the nearest groove, CS=780 nm (note that the cavity can be up to as much as one grating period longer, CL=1277 nm); the deposited SiO2 thickness, SiO2H=100 nm; the SiO2 groove height, SiO2 GH=100 nm; the SiO2 substrate height, SubH=400.0 nm; and the overall diameter, Diameter=6280 nm.

Figure 5:
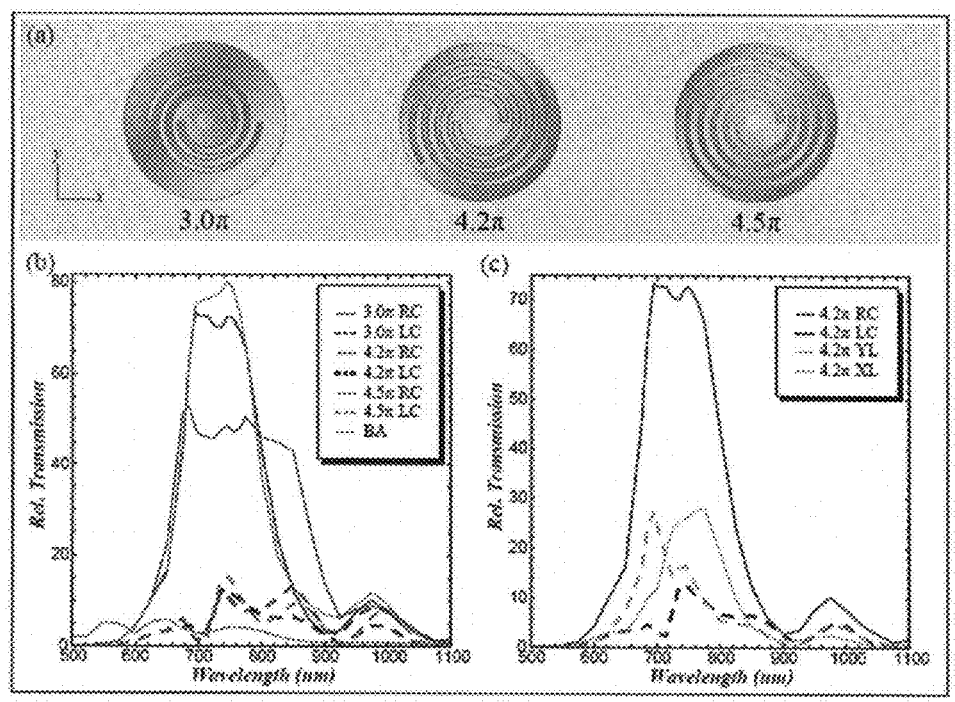
FIG. 5 shows simulation results for various spiral geometries in accordance with embodiments of the present disclosure.

FIG. 5 shows simulation results for three modeled geometries (a) and plots (b) and (c) show relative transmission normalized to the power incident on the aperture 132. The plot in section (b) depicts a spiral arm length study and the plot in section (c) depicts a comparison of right- and left-circular and linear (x- and y-directions) polarization results.

As can be seen in FIG. 5, the selectivity of one circular polarization over the other demonstrates the ability to detect the circular polarization state. A circular micro-polarizer 100 can be fabricated by essentially rotating the structure of FIG. 1 around a central axis, but increasing the radius of the grooves/gratings 116 as they are rotated to create a spiral structure when looking from above.

Figure 6:
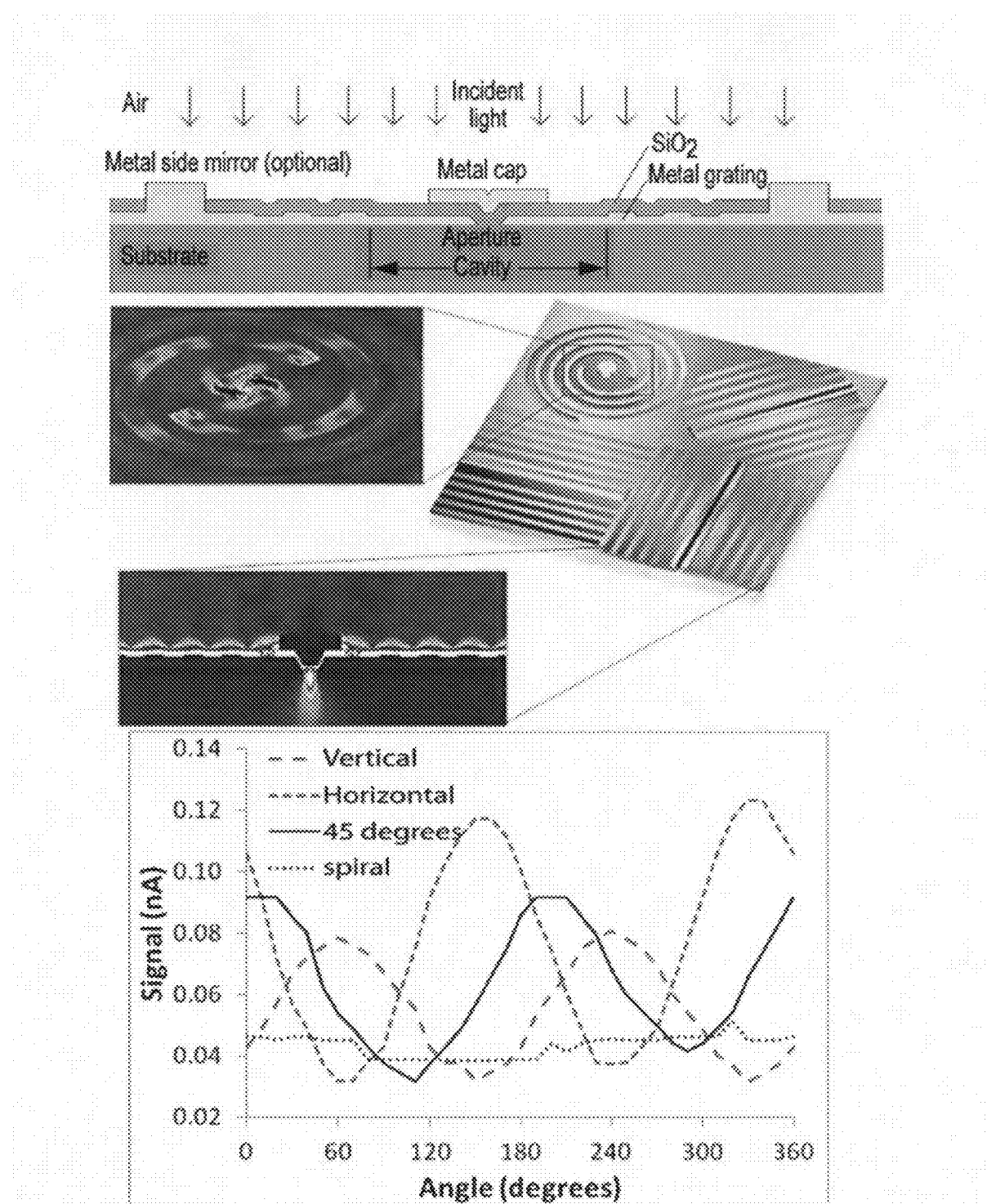
FIG. 6 shows isometric and cross-sectional views of a super pixel for full Stokes vector measurement with calculated time average TM power flow in plane for Archimedean spirals and in cross section for linear gratings in accordance with at least some embodiments of the present disclosure.

As can be seen in FIG. 6, one advantage of this spiral design is the ability to simultaneously fabricate both circular and linear sensitive structures with only horizontal geometry changes. The examples described herein use the convention where right-circular has the meaning that, in a plane perpendicular to the propagation, looking in the direction of propagation, the electric field rotates in the clockwise direction. The spiral configurations shown herein (e.g., FIGS. 4-7) effectively concentrate RC polarized light into the MIM waveguide created by the cap 124 and then transports that energy out of the aperture 132. The field created in the aperture 132 is essentially a rotating dipole which effectively radiates out of the aperture 132 and into the far-field. For LC polarized light, the field is concentrated into a vortex that circles the aperture 132 around and under the cap 124 on the top surface, until the power is absorbed due to Ohmic losses. Therefore, this polarization does not effectively radiate. Interestingly, the grating 116 efficiently couples both polarizations into the central cavity, where the magnitude of the Poynting vector for both exceeds 100 times its magnitude in the incident light.

Figure 7:
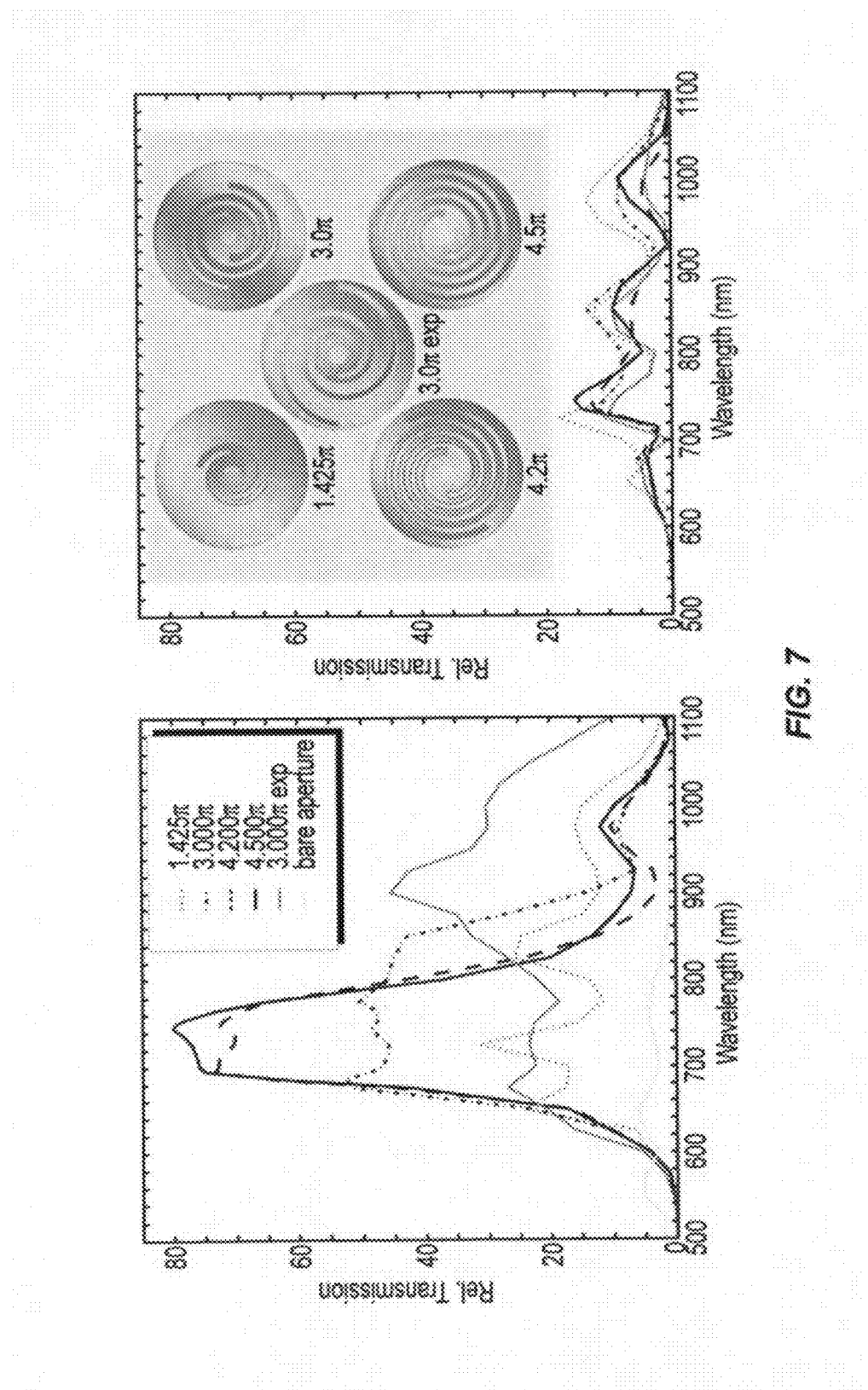
FIG. 7 shows simulation results of spiral gratings with circularly polarized incident light in accordance with embodiments of the present disclosure.

FIG. 7 specifically shows simulations of spiral gratings with circularly polarized incident light. The left plot of FIG. 7 has RC polarization and the right plot has LC polarization. These plots also depict the transmission spectra for four Archimedean and one logarithmic spiral structure. The transmission through a bare aperture 132 is also shown in the left plot.

The time-averaged power flow (Poynting vector) crossing a hemisphere just below the aperture was integrated to yield the magnitude of the power exiting the structure. Representative results are given in FIG. 7 where the effect of changing the Archimedean spiral arm length is shown. All of the simulations showed a preference for RC transmission over LC. Note that inverting the handedness (the angular direction of increasing radius) would result in an LC-selecting element. As the spiral arm length increases, the grating 116 more effectively couples RC light into the plasmon, increasing the transmission through the aperture and narrowing the bandwidth, which is expected for grating-coupled devices. For the different model arm lengths (measured as the angular distance traversed by each arm; 2 π is one full rotation) varying from 1.425π to 4.5π, the relative transmission integrated over all wavelengths increased from 31.3 to 79.6 times the power incident on the 200 nm open aperture area. By contrast, the LC transmission showed little dependence on the spiral arm length. For reference, a bare aperture 132 in gold with no cap or SiO$_2$ coating was modeled and plotted in FIG. 7, which confirms that the spiral structure leads to strong transmission enhancement similar to what is observed with gratings in metal films with subwavelength apertures.[Error! Bookmark not defined.] While the absolute RC transmission increases as the number of turns increases, the active area efficiency (transmission normalized to the spiral area) actually decreases because the area of the structure increases faster than the transmission. The active area efficiency decreased with increasing arm length, from 13.70 to 8.58%. This dependence on the number of grating 116 grooves is consistent with results obtained with linear structures. Note that the only geometric parameter varied in this study was the spiral arm length, so substantial improvements in efficiency are also envisioned with additional optimization.

One feature of this structure is that it has the ability to filter color simultaneously with polarization. The bandwidth of the structure can be controlled, and both narrow-band and wide-band filters have their own applications. Longer spirals are desirable for narrow-band applications. For broad-band applications, shorter arm lengths or a different kind of spiral may be used. FIG. 7 also shows the simulated transmission through a logarithmic spiral where the radius of the spiral varies exponentially with angle. A substantial increase in transmission bandwidth is observed.

Photodiode Integration Examples

As discussed above, one advantage of the proposed technology is the potential for monolithic integration of the plasmonic structures on a CMOS photodiode FPA. The plasmonic structure can be fabricated directly into the Ohmic contact metallization of the diode, completely eliminating the possibility of optical crosstalk due to the polarizing filters. Since transmission is limited to the subwavelength dimension aperture 132, the active area of the diode can be reduced allowing higher speed, lower noise diodes to be used.

For testing purposes, an array of 48 mesa diodes (4 rows of 12 diodes) with contact leads going out to the perimeter of a 1 cm2 chip was fabricated. Diodes were fabricated on 5-10 Ω-cm p-type Si wafers with the junction formed by PECVD growth of 500 Å intrinsic a-Si:H followed by 500 Å n-type a-Si:H. This was followed by blanket evaporation of 200 Å Ni and 2500 Å Au. The Ni acts as both an adhesion layer and as the Ohmic contact to the n-type a-Si:H. Broad-beam Ar ion milling defined the 100 μm×300 μm mesa diode area. This was followed by blanket PECVD growth of 1000 Å SiO2 to passivate the diode side walls and electrically isolate the exposed c-Si of the wafer. A 100 μm×100 μm via at one end of the diode provided an open field for e-beam lithography of the micropolarizers, while an 80 μm×80 μm via at the other end provided contact area for the probe leads formed by evaporation of 25 Å Ti and 2000 Å Au followed by lift-off. A full Stokes vector polarimeter was fabricated using three linear orientations (0, 90, −45°) plus a spiral array in groups of four diodes, forming a 4×3 array using sub-pixel as shown in FIG. 6.

FIG. 6 also shows the detected signal for four sub-pixels as a function of the angle of the incident linearly polarized light. The response is exactly the expected behavior of the polarimeter. The difference in relative size of the signals and the noise in the signal is attributed to variations in the positioning of the illumination spot as the polarization is rotated, which increases or decreases scattering around the edges of the metal pads. Again, this can be eliminated by an array design that has light shields in place between the pixels. This demonstrates the utility of the structure as a micro-polarimeter that is compatible with fabrication directly on detector arrays.

The non-zero minimum signal comes from scattered light hitting the bare silicon around the diode metal, and generated electrons diffusing to the junction.

In other embodiments, a reverse fabrication method could be performed to integrate the micro-polarizer array with a detector array. In particular, it may be possible to reverse the fabrication order and position the micro-polarizer substrate 104 adjacent to a second substrate with the detector array. This would be necessary, for instance, if the detector array uses microbolometers for infrared detection, because building the micro-polarizer on the detector would increase its mass and reduce the sensitivity. In this case, grooves may be required on the output surface to focus light onto the detector. The reverse fabrication approach could also be used with any detector array. In this alternative embodiment, the detector array and the filter array could be fabricated on separate substrates. The filter array would then be flipped and placed on the detector array to complete fabrication of the polarizer.

While the discussion herein has primarily focused on applications in the NIR (700-800 nm peak wavelengths), inventive concepts provided herein can be used in any wavelength region where the metal surface can support a surface plasmon, and a suitable dielectric can be found. Metals support surface plasmons from about 250 nm (Aluminum is the only surface plasmon supporting metal at that wavelength) out to all higher wavelengths. While different dielectric materials may be used in different wavelength regions, suitable transparent materials exist over the same wavelength regime. The only thing that will need to be done to the structure is scaling the thicknesses, and lateral dimensions (e.g. of the grating 116) to fit the wavelength of interest.

While various embodiments have been described in detail, it is apparent that modifications and alterations of those embodiments will occur to those skilled in the art. For example, in the foregoing description, for the purposes of illustration, methods were described in a particular order. It should be appreciated that in alternate embodiments, the methods may be performed in a different order than that described. It is to be expressly understood that such modifications and alterations are within the scope and spirit of the claimed invention, as set forth in the following claims.

What is claimed is:

1. A micro-polarizer comprising a plasmonic focusing structure that both filters light at a predetermined frequency bandwidth and selects a single polarization state, wherein the focusing structure comprises:
    a substrate comprising a top surface and an opposing bottom surface;
    a first metal layer comprising a top surface and an opposing bottom surface positioned adjacent to the top surface of the substrate;
    a dielectric layer comprising a top surface and an opposing bottom surface positioned adjacent to the top surface of the first metal layer;
    a plurality of grooves established in the top surface of the first metal layer, the bottom surface of the dielectric layer, and optionally the top surface of the dielectric layer, wherein the plurality of grooves comprise a cavity between them of a first width; and
    a metal cap positioned adjacent to the top surface of the dielectric layer, wherein the metal cap overlaps the cavity between the plurality of grooves, and wherein the metal cap comprises a width that is less than the first width of the cavity.

2. The micro-polarizer of claim 1, wherein the metal cap is centered with respect to the cavity.

3. The micro-polarizer of claim 2, wherein the focusing structure further comprises:
    an aperture established in the first metal layer and being centrally positioned with respect to the plurality of grooves and the cavity, wherein the dielectric layer at least partially fills the aperture and contacts the top surface of the substrate at a point underneath the metal cap.

4. The micro-polarizer of claim 3, wherein the metal cap and first metal layer each comprise at least one of a surface plasmon supporting material.

5. The micro-polarizer of claim 2, wherein the focusing structure further comprises:
    at least two sidewall mirrors surrounding the plurality of grooves, wherein a height of the at least two sidewall mirrors is greater than a height of the plurality of grooves, and wherein the at least two sidewall mirrors are sized to reflect outwardly propagating surface plasmons back toward the aperture.

6. The micro-polarizer of claim 2, wherein the plurality of grooves are disposed linearly.

7. The micro-polarizer of claim 2, wherein the plurality of grooves are disposed in a spiral fashion.

8. The micro-polarizer of claim 2, wherein the plurality of grooves are disposed radially.

9. The micro-polarizer of claim 1, wherein the single polarization state comprises at least one of a linear polarization state and a circular polarization state and wherein the predetermined frequency bandwidth corresponds to a frequency of visible light.

10. A pixel comprising the micro-polarizer of claim 1.

11. An array of pixels, a first pixel in the array of pixels comprising the micro-polarizer of claim 1 disposed adjacent to an array of detectors.

12. A camera comprising the array of pixels of claim 11.

13. An array of pixels, comprising:
    a first pixel including:
        a first micro-polarizer comprising a first focusing structure that both filters light at a predetermined frequency bandwidth and selects a first polarization state, wherein the first focusing structure comprises:
            a substrate comprising a top surface and an opposing bottom surface;
            a first metal layer comprising a top surface and an opposing bottom surface positioned adjacent to the top surface of the substrate;
            a dielectric layer comprising a top surface and an opposing bottom surface positioned adjacent to the top surface of the first metal layer;
            a plurality of grooves established in the top surface of the first metal layer, the bottom surface of the dielectric layer, and optionally the top surface of the dielectric layer, wherein the plurality of grooves comprise a cavity between them of a first width; and
            a metal cap positioned adjacent to the top surface of the dielectric layer, wherein the metal cap overlaps the cavity between the plurality of grooves, and wherein the metal cap comprises a width that is less than the first width of the cavity.

14. An array of pixels, comprising:
    a first pixel including:
        a first micro-polarizer including a first focusing structure that both filters light at a predetermined frequency bandwidth and selects a first polarization state; and
        a second micro-polarizer including a second focusing structure that both filters light at the predetermined frequency bandwidth and selects a second polarization state different from the first polarization state, wherein at least one of the first focusing structure and second focusing structure comprise:
- a substrate comprising a top surface and an opposing bottom surface;
- a first metal layer comprising a top surface and an opposing bottom surface facing toward the top surface of the substrate;
- a dielectric layer comprising a top surface and an opposing bottom surface facing toward the top surface of the first metal layer;
- a plurality of grooves established in the top surface of the first metal layer, wherein the plurality of grooves comprise a cavity between them of a first width; and
- a metal cap overlapping the cavity between the plurality of grooves, wherein the metal cap comprises a width that is less than the first width of the cavity.

15. An array of pixels, comprising:
a first pixel including:
- a first micro-polarizer including a first focusing structure that both filters light at a predetermined frequency bandwidth and selects a first polarization state;
- a second micro-polarizer including a second focusing structure that both filters light at the predetermined frequency bandwidth and selects a second polarization state different from the first polarization state; and
- a third micro-polarizer including a third focusing structure that both filters light at the predetermined frequency bandwidth and selects a third polarization state different from the first and second polarization states, wherein at least one of the first focusing structure, the second focusing structure, and the third focusing structure comprise:
  - a substrate comprising a top surface and an opposing bottom surface;
  - a first metal layer comprising a top surface and an opposing bottom surface facing toward the top surface of the substrate;
  - a dielectric layer comprising a top surface and an opposing bottom surface facing toward the top surface of the first metal layer;
  - a plurality of grooves established in the top surface of the first metal layer, wherein the plurality of grooves comprise a cavity between them of a first width; and
  - a metal cap overlapping the cavity between the plurality of grooves, wherein the metal cap comprises a width that is less than the first width of the cavity.

16. An array of pixels, comprising:
a first pixel including:
- a first micro-polarizer including a first focusing structure that both filters light at a predetermined frequency bandwidth and selects a first polarization state;
- a second micro-polarizer including a second focusing structure that both filters light at the predetermined frequency bandwidth and selects a second polarization state different from the first polarization state;
- a third micro-polarizer including a third focusing structure that both filters light at the predetermined frequency bandwidth and selects a third polarization state different from the first and second polarization states; and
- a fourth micro-polarizer including a fourth focusing structure that both filters light at the predetermined frequency bandwidth and selects a fourth polarization state different from the first, second, and third polarization states, wherein at least one of the first focusing structure, the second focusing structure, the third focusing structure, and the fourth focusing structure comprise:
  - a substrate comprising a top surface and an opposing bottom surface;
  - a first metal layer comprising a top surface and an opposing bottom surface facing toward the top surface of the substrate;
  - a dielectric layer comprising a top surface and an opposing bottom surface facing toward the top surface of the first metal layer;
  - a plurality of grooves established in the top surface of the first metal layer, wherein the plurality of grooves comprise a cavity between them of a first width; and
  - a metal cap overlapping the cavity between the plurality of grooves, wherein the metal cap comprises a width that is less than the first width of the cavity.

17. The array of pixels of claim 16, wherein the fourth polarization state comprises a circular polarization state and wherein the first, second, and third polarization states comprise differently-oriented linear polarization states.

18. The array of pixels of claim 16, wherein the third and fourth polarization states comprise a circular polarization state and wherein the first and second polarization states comprise differently-oriented linear polarization states.

* * * * *